Oct. 19, 1965   Y. W. EHRET ETAL   3,213,286
AUTOMATIC RAILROAD SWITCH LIGHT
Filed Nov. 1, 1962   2 Sheets-Sheet 1

Inventors
Yale W. Ehret
and Charles M. Miller
By Mann, Brown & McWilliams
Attys.

Oct. 19, 1965          Y. W. EHRET ETAL          3,213,286
                  AUTOMATIC RAILROAD SWITCH LIGHT
Filed Nov. 1, 1962                              2 Sheets-Sheet 2

Inventors
Yale W. Ehret
and Charles M. Miller
By Mann, Brown & McWilliams
Attys.

United States Patent Office 3,213,286
Patented Oct. 19, 1965

3,213,286
AUTOMATIC RAILROAD SWITCH LIGHT
Yale W. Ehret and Charles M. Miller, Elkhart, Ind., assignors to The Adams & Westlake Company, Elkhart, Ind., a corporation of Illinois
Filed Nov. 1, 1962, Ser. No. 234,651
2 Claims. (Cl. 250—239)

This invention relates to a railroad switch light and more particularly, is concerned with an improved arrangement and construction for a railroad switch light that ensures long term, reliable performance.

It is usually preferred that a railroad switch light be operated from a storage battery. Because of the expense of replacement of batteries at remote locations, it is important to extend the life of the batteries by limiting lamp operation to periods of darkness.

Railroad switch lights of the type to which the present invention is directed are coupled to switches and are relied upon in controlling and regulating railroad traffic. Safety considerations are involved and railroad switch lights should have "fail safe" characteristics.

Accordingly, the principal objects of the invention are to provide an improved railroad switch light: that automatically controls its on and off periods in a fashion to conserve current drain upon the battery; that is fail safe in the event of failure of its automatic controls; that is versatile in application; that is durable and long-timed; that is protected from shock; and that facilitates installation and maintenance.

In the preferred embodiment of the invention a photoelectric device, particularly a solar cell, is connected into the control circuit of a transistor-operated railroad switch light in such an arrangement that when light strikes the cell, the cell will bias the transistor in a sense to stop the conduction of the current. In this manner, normal operation of the railroad switch light will not be interfered with during darkness, but during daylight hours the unit will automatically remain out of operation. The operation and the utility of the invention will be more fully and more completely understood upon consideration of the following description and of the drawings in which:

Figure 1:
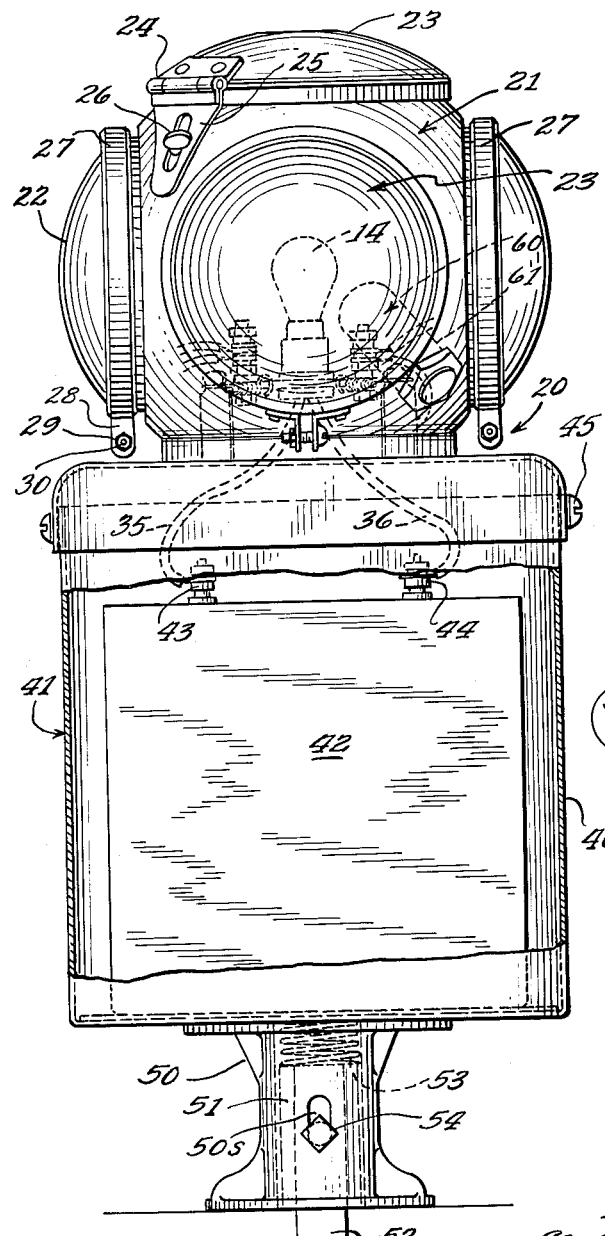
FIGURE 1 is a front elevational view of the complete assembly comprising the present invention.

Referring now to the drawings, FIGURE 1 shows a typical railroad switch light arrangement constructed in accordance with the present invention. As shown in this figure, the control device of the invention, which will be designated in general as control means 20, is mounted in a housing 21. The lamp 14 is also contained within this housing 21. The housing 21 is provided with one or more colored lenses 22 which are illuminated when the lamp 14 lights. A cover 23 surmounts the housing 21. This cover 23 is preferably hinged 24 or otherwise secured in a manner to permit access to the housing 21. The hinged cover 23 is provided with a hasp 25 and a catch 26 to maintain the cover secured in position. The lenses 22 are removably secured in the housing 21 by means of external clamping rings 27 secured by means of brackets 28 and suitable fasteners such as nuts 29 and bolts 30.

Figure 2:
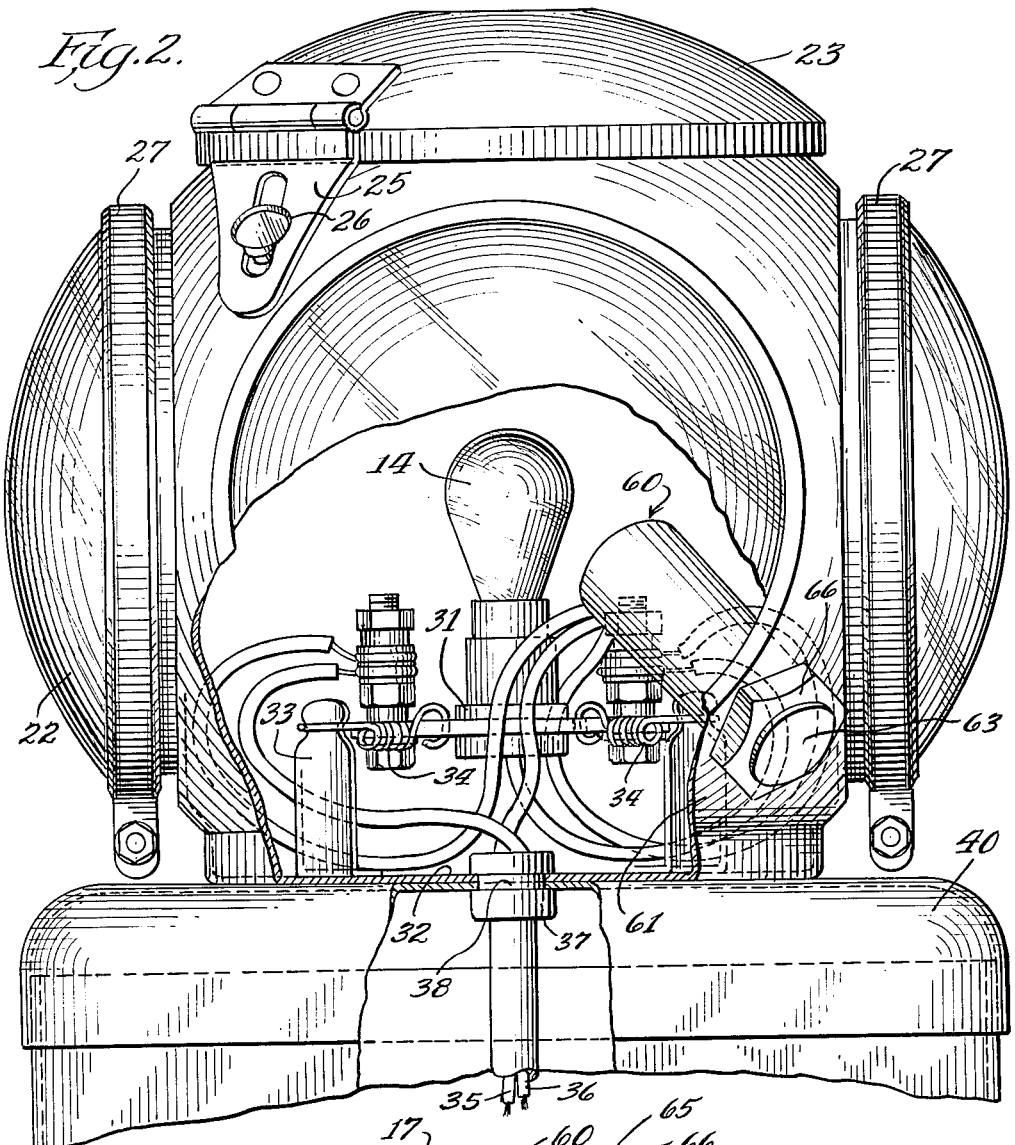
FIGURE 2 is a fragmentary vertical sectional view of the lamp housing of the invention.

As illustrated in FIGURE 2, the lamp 14 is mounted in a base 31 spaced above a bottom housing wall 32 by means of upstanding pillars 33 within the housing 21. The lamp base 31 is suspended from the pillars 33 by means of springs 34 to provide a shock mounting for the lamp 14. Electrical leads 35 and 36 that connect the lamp base 31 to the battery 42 (FIGURE 1) project through a grommet or bushing 37 that lines an opening 38 provided through the bottom wall 32 of the housing 21.

The bottom wall 32 of the housing 21 is supported as indicated in FIGURE 1, on a top cover 40 of a battery box 41 which contains the battery 42 which is the source of the electrical power for the lamp 14. The leads 35 and 36 from the lamp base 31 are connected to positive and negative terminals, 43 and 44, respectively, of the battery 42. The battery box cover 40 is fastened to the battery box by means of screws 45 which thread into the sides or panels 46 of the battery box. The panels 46 are colored to correspond with the colored lenses 22 with which they are ganged for simultaneous selected positioning.

The battery box 41 is mounted on a tubular base casting 50 fitted with a vertically slideable internal sleeve 51 that is adapted to engage over the usual rotatable switch peg 52. A spring 53 within the top of the casting 50 reacts between the sleeve 51 and the battery box 41 to provide a shock absorbing mounting for the entire switch light unit. A bolting mechanism 54 secures the switch light onto the peg 52 and the casting 50 has vertical slots 50S accommodating limited vertical movement.

The peg 52 is rotatable under the control of a conventional switch unit (not shown) and causes the switch light to rotate correspondingly and provide a visual indication of the position of such switch unit.

Figure 3:
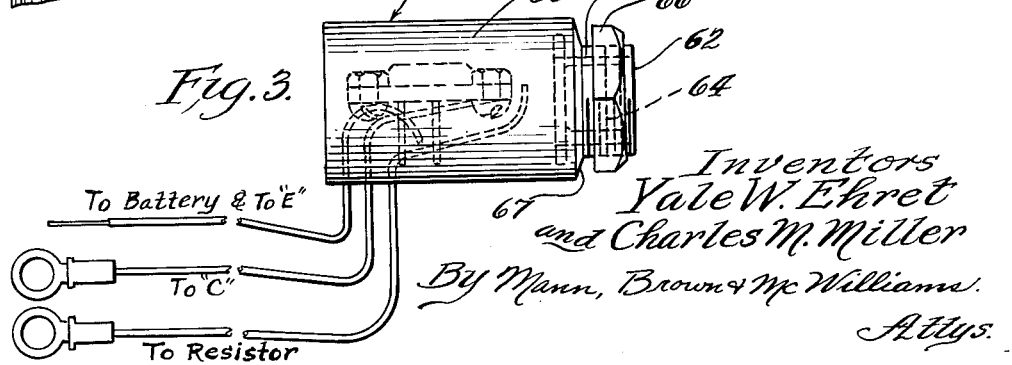
FIGURE 3 is a side elevational view showing details of the solar cell of the invention.

As indicated in FIGURES 1 and 2, a solar switch 60 is mounted in an obliquely downward facing wall portion 61 of the housing 21 in a position such that the photo or light-sensitive face 62 of the solar switch looks obliquely downwardly through a window 63 in the housing wall 61. A threaded portion 64 (as shown more clearly in FIGURE 3) of the photocell mounting assembly 65 projects through the window 63 and a nut 66 is tightened in place to bring the shoulder 67 of the solar switch mounting assembly 65 to bear against edge portions of wall 61 that border the window 63 in the housing 21. Suitable O rings and seals are provided to render the overall assembly moisture-proof and water-tight.

An important feature of the present invention resides in the disposition of the solar switch 60. With the arrangement of the switch 60 shown in FIGURE 1, it will be understood that only the desired rays of light will reach the cell and undesired rays from automobiles, and other intermittent sources will not act to quench the lamp. In the present arrangement, which is an important feature of the invention, the cell has its photosensitive surface inclined obliquely downwardly as shown in FIGURES 1 and 2 to minimize the light accumulated thereon from other than a horizontal direction.

Figure 4:
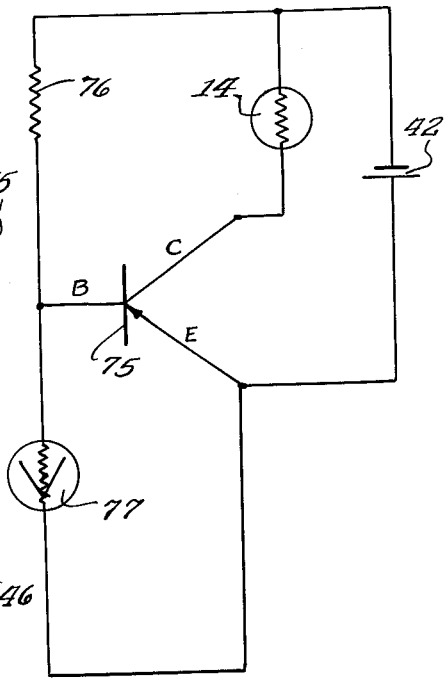
FIGURE 4 is a diagrammatic illustration of the electrical control circuit of the invention.

Referring now to the circuit diagram of FIGURE 4, the battery 42 supplies current to the solar switch circuit 60. The lamp 14 and a power transistor 75 are placed in series in a grounded collector circuit. The base B of the transistor 75 is normally biased to prevent a flow of current from the emitter E to the collector C. This results in only a very minute current flow in the lamp circuit, and during this condition the current flow is ordinarily less than about 6 ma.

The biasing of the transistor to a non-conductive condition is controlled by the solar cell 77 connected across the base and the emitter of the transistor 75. When light falls on the cell the bias on the transistor is such that current will not flow through the lamp 14. The solar cell 77 is so arranged that when no light shines upon its activating surface, current is free to flow from the battery through resistor 76 to the transistor base B. Thus, during darkness the railroad switch light is illuminated but during daylight hours when light falls upon the solar cell, the lamp 14 will not light. With the approach of darkness, the effect of the solar cell is eliminated and normal operation of the light is resumed.

The railroad switch light of the present invention has many advantages. Because it utilizes a transistor it will operate almost indefinitely without attention or need for part replacement. The incorporation of an automatic turn-off during daylight hours achieves a considerable saving in operating cost. There is substantially no current drain during daylight hours, the only flow of current being the extremely small leakage and small currents through the transistor junction.

Moreover, the railroad switch light of the present invention will operate over extended periods of time without need for battery renewal or replacement since the current drain is exceptionally low.

While the invention has been described and illustrated by way of preferred embodiments thereof, it will be apparent to those skilled in the art that variations and modifications may be made without departing from the scope of the present invention as defined by the appended claims.

What is claimed is:

1. In a ground level railroad switch light assembly that includes a battery storage box having an open top, a battery within the box, a cover removably mounted on the box in closure relation to the top and having a flat upper surface, a globe-like lamp housing mounted atop said cover and having translucent windows facing horizontally at points spaced about a vertical axis through said housing, said housing having opaque side and top wall structure of convexly rounded contour bridging between, around, and beneath said windows, means for rotating said box about said axis for selectively positioning said windows in accordance with track switch positions, a lamp within said housing, and electrical conductors connected to the battery and extending into the housing for connection to the lamp; an automatic control arrangement for energizing said lamp only during the existence of a predetermined condition of ambient darkness and comprising a circuit for completing a connection between said battery and said lamp through said electrical conductors; a light transmitting window spanning an interrupted portion of said opaque wall structure at a region of said housing that has a normal line directed obliquely downwardly and outwardly relative to the vertical axis, a photocell mounted within said housing and having a light sensitive face shielded from illumination internal of the housing and imaged through said last named window only along a line that extends obliquely downwardly and outwardly relative to said axis and that intercepts a portion of said flat upper surface, and means connecting said photocell in controlling relation in said circuit to interrupt such connection unless said predetermined condition of ambient darkness exists.

2. In a ground level railroad switch light assembly that includes a battery storage box having an open top, a battery within the box, a cover removably mounted on the box in closure relation to the top and having a flat upper surface, a globe-like lamp housing mounted atop said cover and having translucent windows facing horizontally at points spaced about a vertical axis through said housing, said housing having opaque side and top wall structure of convexly rounded contour bridging between, around, and beneath said windows, means for rotating said box about said axis for selectively positioning said windows in accordance with track switch positions, a lamp within said housing, and electrical conductors connected to the battery and extending into the housing for connection to the lamp; an automatic control arrangement for energizing said lamp only during the existence of a predetermined condition of ambient darkness and a light transmitting window spanning an interrupted portion of said opaque wall structure at a region of said housing that has a normal line directed obliquely downwardly and outwardly relative to the vertical axis, a photocell mounted within said housing and having a light sensitive face imaged through said last named window only along a line that extends obliquely downwardly and outwardly relative to said axis to intercept a portion of said flat upper surface, a circuit for completing a connection between said battery and said lamp through said electrical conductors in response to signals from said photocell and including a switching transistor having base, emitter, and collector elements, one of said conductors being connected to said emitter element, means connecting the lamp between said collector element and the other of said conductors, and means connecting said photocell between said base and emitter elements.

References Cited by the Examiner

UNITED STATES PATENTS

| | | | |
|---|---|---|---|
| 1,905,276 | 4/33 | Erickson | 250—200 X |
| 2,831,981 | 4/58 | Watts | 250—239 X |
| 2,974,255 | 3/61 | Platzer et al. | 250—217 X |
| 2,978,951 | 4/61 | Ringer | 250—239 |
| 2,987,957 | 6/61 | Lovegrove | 250—214 X |
| 3,053,985 | 9/62 | Grammer et al. | 250—214 X |
| 3,088,051 | 4/63 | Scanlon | 250—200 X |

RALPH G. NILSON, *Primary Examiner.*

ARCHIE R. BORCHELT, *Examiner.*